Aug. 31, 1937.   W. H. HIMES   2,091,734
FURNACE CONTROL SYSTEM
Filed May 8, 1936   2 Sheets-Sheet 2
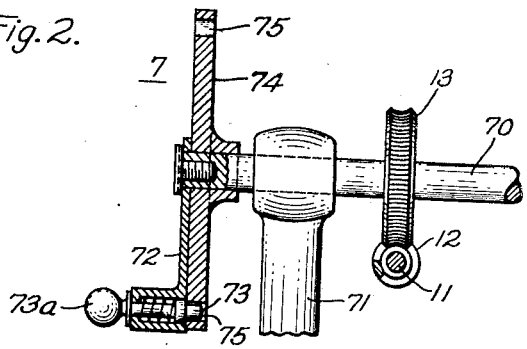
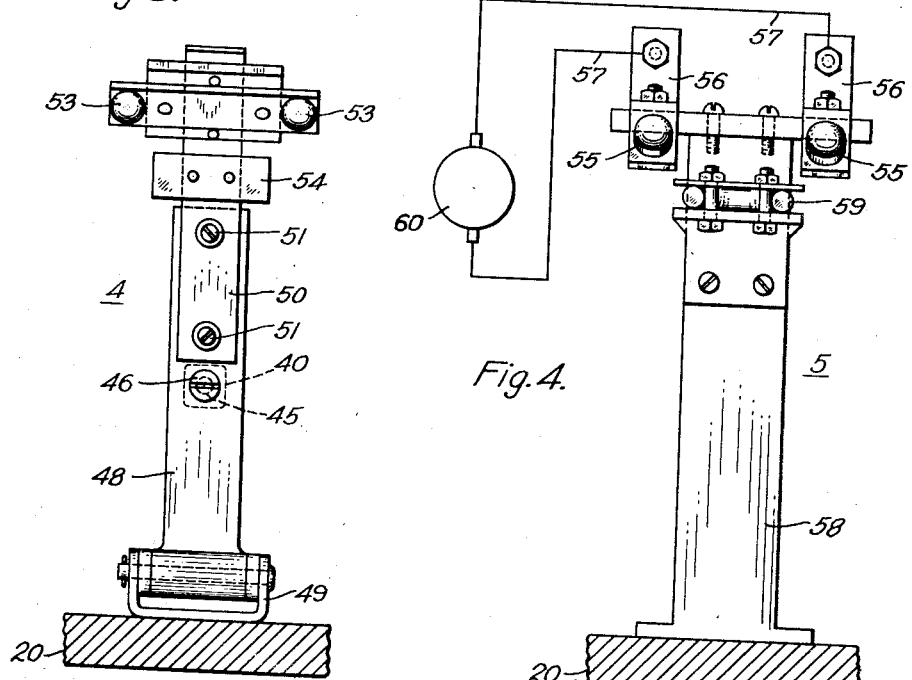
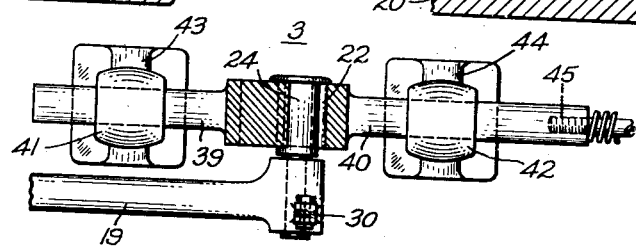
WITNESS
Wm. C. Groome
INVENTOR
Walter H. Himes.
BY
William R. Coley
ATTORNEY Patented Aug. 31, 1937

2,091,734

UNITED STATES PATENT OFFICE 2,091,734

FURNACE CONTROL SYSTEM

Walter H. Himes, Wilkinsburg, Pa.

Application May 8, 1936, Serial No. 78,580

20 Claims. (Cl. 200—139)

My invention relates to furnace control systems and especially to the control of such furnaces or heating units as are operated by electric motors, but may be modified for use in connection with other power sources.

My invention is intended to replace the well known bimetallic thermostat, with all its adjuncts, such as relays, transformers, etc. It is well known in the art that the commonly used thermostat does not give ideal control because it overshoots, that is, it does not function until the critical temperature is actually reached, which is too late.

In the morning, for instance, when the dwelling is cold, the furnace, fuel bed and air pipes become very hot by the time the critical temperature is reached, and by the time this excess heat is used up the dwelling is overheated. When the dwelling has cooled to the critical temperature again, the furnace, pipes and to some extent the fuel bed have cooled also and the air has ceased to circulate. Again time must elapse before the furnace can warm up and start air circulating again.

From the standpoint of control, the ideal system would be that of a variable speed motor operating constantly and controlled at the required speed by a bellows type thermostat. On a cold morning such a device would work at full speed while the house was appreciably below normal temperature, and as normal or critical temperature was approached, the bellows would expand and gradually slow down the speed, and the corresponding heat delivery, so as to reach a normal rate of supply as the normal temperature was arrived at. Thus there would be a continuous supply of heat modulated to the requirements.

However, variable speed motors are not practical for domestic installations, and the intermittent or "on and off" system seems to be the most suitable. In my system, I so modify the "on and off" system as to achieve the results or benefits of the continuous system.

This is done in the following manner: The control starts the stoker or furnace regularly, say, every ten minutes (any similar time cycle may, of course, be chosen). On very cold days, the stoker may run eight minutes before it stops. It will then be idle for only two minutes before it starts its next run. In moderate weather, it may run only five minutes and be idle five minutes. At night it runs only one minute to one and one-half minutes out of the ten. In this way, there is never a period of rest long enough to cause a cessation of heat—there is always a continuous supply, although the amount may be readily modified by varying the length of run to meet requirements.

One of the objects of my invention, therefore, is to provide a simple, effective and rugged mechanism for varying the length of active operation of a furnace or the like in accordance with the temperature of the rooms to be heated, so that no overshooting of the desired temperature occurs.

Another object of my invention is to provide a furnace control system, including reciprocatory means for effecting the operation of control means for the furnace, together with a mechanism preferably thermostatically operated for varying the effective length of stroke of the reciprocatory means.

Another object of my invention is to provide a system of the character in question in which eccentrically mounted means is provided for effecting the operation of the contact means for controlling the furnace motor, for example.

A further object of my invention is to provide a reciprocatory or eccentrically mounted means for the purpose in question comprising a structure having a slotted portion cooperating with such means and with the contact means for varying the effective length of stroke of the former and thereby determining the proportionate length of time that the furnace is in active operation.

Another object of my invention is to provide a timing means for cooperating with the above-mentioned furnace control means, whereby a lower temperature is maintained during the night and a higher temperature is automatically put into effect at a predetermined time in the morning, all by varying the relative proportion of time that the furnace motor is in operation.

Other objects of my invention will become evident from the following detailed description taken in conjunction with the accompanying drawings, wherein:

Fig. 2 is an enlarged view in end elevation, partly in section, showing the timing dial of Fig. 1 and taken along the line II—II thereof;

Fig. 3 is a view in end elevation of the switch lever shown in Fig. 1, and taken along the line III—III thereof;

Fig. 4 is a view in end elevation showing the two stationary contacts for cooperating with the switch lever of Fig. 2, and taken along the line IV—IV of Fig. 1; and Fig. 5 is a view, partly in section and partly in elevation, taken along the line V—V of Fig. 1.

Figure 1:
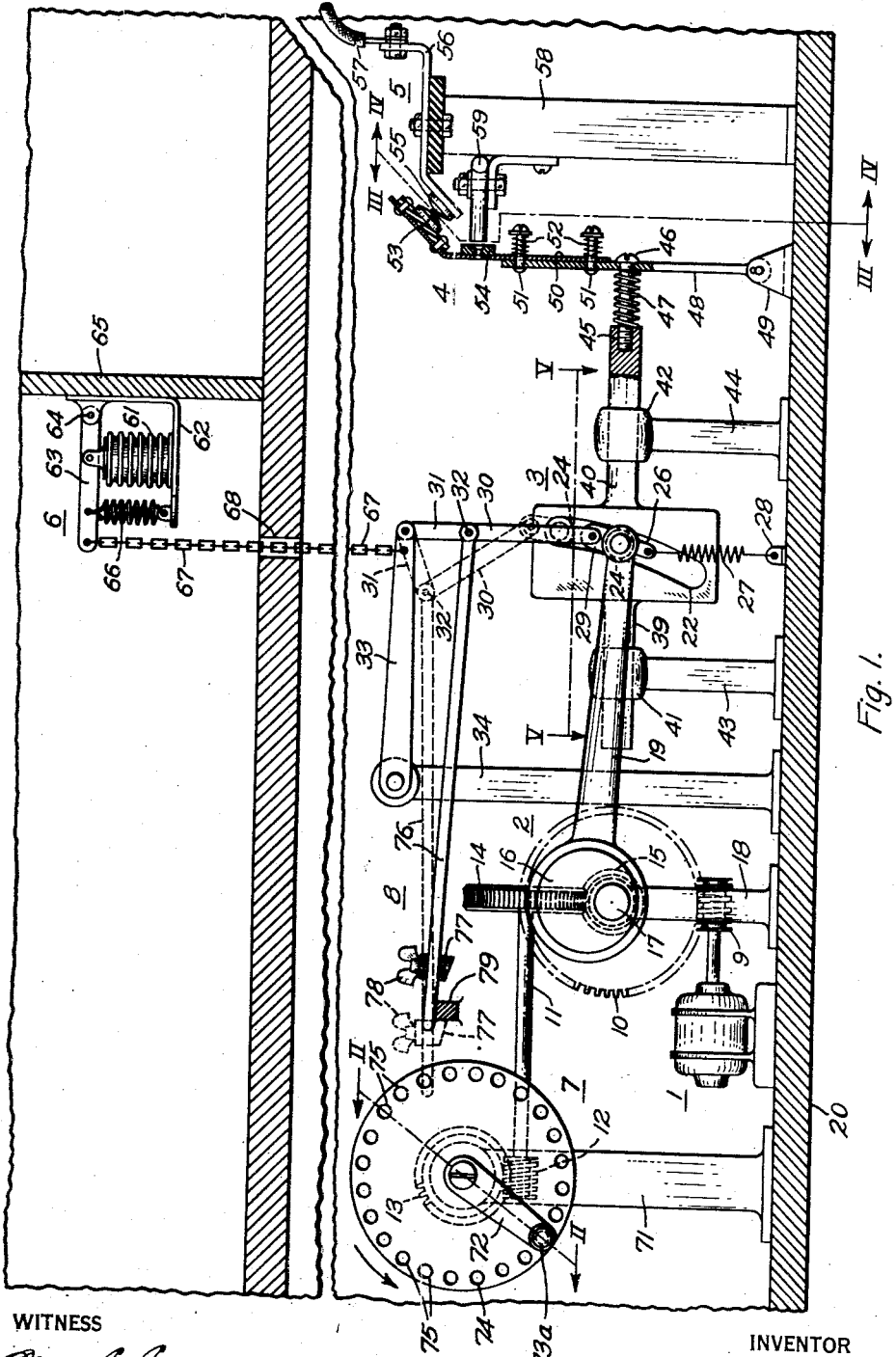
Figure 1 is a view in side elevation of an apparatus embodying one form of my invention.

Referring to the drawings, the apparatus here shown comprises a driving motor 1 for the regulating apparatus, which is preferably located in the basement and includes an eccentric or reciprocatory device 2 cooperating with a slotted structure 3 to control the period of dwell in its closed position of a movable contact mechanism 4 cooperating with a stationary contact mechanism 5. A thermostatic device 6, preferably located in the living room, is adapted to cooperate with the slotted structure 3 and the contact means 4 to vary such relative period of dwell. A timing dial 7 is provided for cooperating with a shiftable means 8 for automatically increasing the controlled temperature at a predetermined time in the morning.

The driving motor 1 may be of any suitable type, preferably being a synchronous motor, and is connected through any suitable speed-reduction mechanism, such as a worm 9 and a worm gear 10, the latter being secured to and driving a suitable shaft 17, preferably integral with respect to the eccentrically mounted movable disc or plate 16 of eccentric means 2, and which shaft is supported by suitable standards or bearing pedestals 18. A worm 15, secured to shaft 17, drives a worm gear 14 affixed to a shaft 11 which at one end is provided with a worm 12 for driving a worm gear 13 on the timing mechanism 7. The motor speed and gear ratios are such that eccentric means 2 makes one complete revolution in, say, ten minutes, while timing dial 7 makes one complete revolution in twenty-four hours. A base 20 for the entire regulating apparatus (which may be relatively small in size) is preferably provided.

The outer end of arm 19 may be provided with a downwardly projecting lug 26 to which is secured a spring 27 suitably attached to a fastening member 28 on the base 20. The purpose of this spring is to bias the eccentric arm 19 toward its lowermost position, which action is opposed by the action of the thermostatic device 6, as hereinafter more fully set forth.

The outer end of the eccentric arm 19 is further provided with an upwardly extending lug 29 to which is pivotally secured an articulated upwardly extending arm 30—31 having an intermediate pivot or articulated joint 32. The upper arm 31 is pivotally secured to a horizontal arm 33, which in turn is pivotally mounted upon a stationary pedestal 34.

The slotted structure 3 is provided at its sides with preferably rectangular shafts 39 and 40 which are adapted to slide through suitable bearings 41 and 42 respectively mounted on pedestals 43 and 44. The purpose of such rectangular shaft is to prevent rotative movement of the slotted structure 3.

In the outer end of the rectangular shaft 40, an adjusting screw or bolt 45 is threaded in position, the head 46 of the screw being secured to a movable arm 48 of the contact means 4 and a helical spring 47 being interposed between the end of the shaft 40 and the confronting face of the movable arm 48, for a purpose to be hereinafter set forth.

The contact means 4 may be of any suitable type, either snap-acting or otherwise, and is shown here as comprising an oscillating arm 48 pivotally mounted upon a base 49 to which is resiliently secured a contact bearing plate 50 by means of screws 51 and helical coil members 52.

A pair of movable contact members 53, shown in front view in Fig. 3, are insulatedly secured to the plate 50, which at a point below these contact members may be provided with an armature 54, for a purpose to be described.

The stationary contact members 55 are also two in number, being shown in front view in Fig. 4, and are respectively mounted upon suitably bent contact-carrying plates 56 to one end of which suitable cables or leads 57 are secured and which are insulatedly mounted upon a pedestal 58.

As indicated in Fig. 4, the stoker or furnace motor 60 may be connected through leads 57 to the contact members 55, whereby the motor is started into operation whenever movable contact members 53 engage stationary contact members 55. It will be evident that my regulating apparatus may be located at any convenient place, not necessarily near the furnace.

A permanent magnet 59, which may comprise a U-shaped bar, is secured to the pedestal 58 for the purpose of attracting the armature 54 and so securing snap action of the contact means 4 in a well known manner.

It will be understood that some form of furnace control means other than that illustrated may be employed, if desired. For instance, the regulated reciprocatory movement of my apparatus may be utilized to electrically or otherwise control a valve for governing the flow of gas or oil to a furnace.

The thermostatic device 6 is preferably of the well known bellows type, being here shown as comprising a suitable bellows member 61 mounted upon a bent plate member 62, the vertical portion of which is suitably secured to a wall or partition 65. A movable arm 63 is pivoted at 64 to the said vertical portion of the plate 62 and a helical spring 66 has its end secured in the stationary plate 62 and the movable arm 63 to oppose the upward expanding action of the bellows 61.

A chain or cable 67 extends from movable arm 63 through an opening 68 in the room floor, and its lower end is attached to the horizontal lever 33 at a point near the end of the vertical lever 31, whereby movement of bellows member 61 serves to change the position of bearing member 24 on eccentric arm 19, thus changing the dwell of contact means 4 in its closed position responsive to variations in room temperature.

It will be noted that movement of the eccentric means 2 when driven by the motor 1 always produces the same reciprocatory stroke, but the effect thereof on the arm 48 of the contact means 4 is dependent upon the particular position in the slot 22 that is occupied by the bearing member 24 of the eccentric arm 19. When this bearing member 24 occupies the lowermost position, the slotted structure 3 is forced to the right to compress the spring 47 and cause the arm 48 of the contact means 4 to occupy its closed or right-hand position for a relatively long period of time. On the other hand, when the bearing 24 on the end of eccentric arm 19 is moved to its uppermost position in the slot 22, the slotted structure 3 is moved to the left and, therefore, the relative length of time that the arm 48 of the contact means 4 occupies its right-hand or circuit-closing position is correspondingly reduced. At any intermediate point, the relative length of time that the contact means 4 is closed is varied in proportion, as previously discussed.

It will be noted that the slotted structure 3 and oscillating contact arm 48 move forwards and backwards in unison except when contact members 53 and 55 are in engagement, during which period spring 47 permits the necessary movements of slotted structure 3—toward the right after such engagement is first effected and towards the left before the contact members are disengaged. A resilient engagement of the contact members is thus insured over periods dependent upon the position of bearing 24 in slot 22 of slotted structure 3.

The apparatus is so designed that, when the bearing 24 is at the mid point in the slot 22, the contact means 4 makes full contact at about mid stroke and, therefore, the duration of contact is for about one-half of a revolution of the eccentric or, in other words, one-half of the time that the apparatus is in operation. As the thermostat 6 permits the bearing 24 to lower, by reason of the living room temperature decreasing, the slotted structure 3 is forced to the right, contact means 4 stays closed a longer period of time, and, therefore, the furnace is kept in operation for a correspondingly longer period, thereby raising the living room temperature to the desired figure.

Conversely, upward expansion of the thermostatic device, by reason of the room temperature increasing, to raise the position of the bearing 24 causes a corresponding reduction in the period when the contact means 4 occupies its closed position and, therefore, reduced stoker activity.

An important feature of this mechanism is that it anticipates the critical temperature so as to avoid "overshooting". Suppose, for instance, that the room is relatively cold as in the morning. The thermostat is then contracted to the limit, causing the longest possible dwell of the contacts. As the room becomes warmer, the thermostat expands proportionately, reducing by degrees the contact periods, before the critical or normal temperature is attained. By the time the normal temperature has been attained, the gradual expansion of the thermostat will have reduced the time of contact to normal, by gradual decrements, and thereafter the thermostat will remain stationary until weather or other conditions call for change.

The timing device 7 is utilized for the purpose of maintaining a relatively low temperature during the night and automatically raising this temperature to the desired living room temperature at any given time in the morning. To this end, the shaft 70 on which the worm gear 13 is mounted is provided with suitable bearings in pedestals 71, and an arm 72 is loosely attached to this shaft. As more clearly shown in Fig. 2, a pin 73 is adapted to extend into one of a number of holes or openings 75 in a plate or dial 74, this pin being provided at its outer end with a knob 73a and being spring pressed into its position engaging one of these openings 75. Preferably the dial 74 is provided at its periphery with forty-eight such openings, one for each half hour of the day, since the dial is so geared as to make only one revolution in twenty-four hours. However, for illustrative purposes, the dial is shown as provided with twenty-four such openings.

The shiftable means 8 cooperates with the timing mechanism 7, this means comprising a member or latch bar 76 which has its right-hand end attached to the articulated joint 32, while near its free end a stop or latch member 77, secured in position by a wing nut 78, is provided.

Under normal conditions, that is, during the daytime, the latch bar 76 maintains the solid line position shown in which the free end thereof rests on a stationary stop 79. Since there is no engagement between the timing mechanism 7 and the latch bar at this time, there is no control of the contact-making means 4 by the timing mechanism. However, at any time during the evening when it is desired to reduce the living room temperature on account of the occupants of the house retiring, for example, the member 76 is shifted to the left into the illustrated dotted line position (corresponding to 11:00 p. m.), wherein the latch 77 engages the stationary stop member 79. This action, of course, moves the articulated joint 32 correspondingly to the left (as shown in dotted lines) and, therefore, draws the bearing 24 on the end of the eccentric arm 19 into its uppermost position, the same as if the thermostat 6 had expanded to its uppermost heat response position. As a result, the slotted structure 3 is moved as far as possible to the left, whereby the contact means 4 is moved to its contact-engaging position during the action of the eccentric means for not more than one and one-half or two minutes out of the total ten-minute cycle thereof, so that the furnace is operated a correspondingly short period of time and the living room temperature is reduced accordingly.

If the arm 72 is manually set at a hole 75 corresponding to, say, 7:00 a. m., then, in eight hours, the timing dial 7 will rotate the arm 72 around to a point where it will engage the latch bar 76. This engagement will lift the latch 77 off the stationary stop 79 and the spring 27 on the slotted structure 3 will pull the articulated joint 32 back to its normal or solid line position. This, of course, causes the bearing 24 on the end of eccentric arm 19 to drop to some lower position in the slot 22 and thereby cause the contact means 4 to occupy its closed position for a greater period of time during each cycle and thus increase the furnace activity.

It will be seen that I have thus provided a relatively simple, reliable and rugged device for varying the proportionate period of time when a furnace is in operation, the thermostatic device shown being adapted to gradually vary the position of a control member as the critical temperature is approached, thereby automatically and correspondingly varying such proportionate period so that, when the critical temperature is reached, the furnace activity has been slowed down to such a point that there is no overshooting of the living room temperature. In this way, the desired living room temperature is maintained very closely uniform under all conditions during the daytime, whereas during the sleeping hours the room temperature is reduced by reason of decreasing the stoker activity, but the stoker is automatically operated to increase the room temperature to the desired figure at any predetermined hour in the early morning.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. A furnace control system comprising contact means movable into an opening and a closing position, reciprocatory means for effecting the operation of said contact means into said open and closed positions, and means coacting with said reciprocatory means and with said contact means and adjustable with respect to said reciprocatory means transversely only for varying the relative periods of dwell of the latter in said open and said closed positions.

2. A furnace control system comprising control means movable into an opening and a closing position, eccentrically mounted means operable in a fixed orbit for effecting the operation of said control means, and means for varying the effective length of movement of said eccentrically mounted means.

3. A furnace control system comprising contact means movable into an opening and a closing position, eccentrically mounted means operable in a fixed orbit for effecting the operation of said contact means into said open and closed positions, and means coacting with said eccentrically mounted means and said contact means for varying the relative periods of dwell of the latter in said open and said closed positions.

4. A furnace control system comprising contact means movable into an opening and a closing position, reciprocatory means for effecting the operation of said contact means, and means comprising a structure having a slotted portion cooperating with said reciprocatory means for varying the effective length of stroke of said reciprocatory means.

5. A furnace control system comprising contact means movable into an opening and a closing position, reciprocatory means for effecting the operation of said contact means into said open and closed positions, and means having a slotted portion cooperating with said reciprocatory means and with said contact means for varying the relative periods of dwell of the latter in said open and said closed positions.

6. A furnace control system comprising contact means movable into an opening and a closing position, eccentrically mounted means for effecting the operation of said contact means, and means comprising a structure having a slotted portion cooperating with said eccentrically mounted means for varying the effective length of movement of said eccentrically mounted means.

7. A furnace control system comprising contact means movable into an opening and a closing position, eccentrically mounted means for effecting the operation of said contact means into said open and closed positions, and means comprising a member having a slotted portion cooperating with said eccentrically mounted means and with said contact means for varying the relative periods of dwell of the latter in said open and said closed positions.

8. A furnace control system comprising contact means movable into an opening and a closing position, a reciprocatory structure having a slot therein extending at an acute angle with the line of reciprocation, reciprocatory means having a portion with a bearing in said slot, and means for shifting the position of said bearing to vary the proportionate period of dwell of said contact means in its closed position.

9. A furnace control system comprising contact means movable into an opening and a closing position, reciprocatory means for effecting the operation of said contact means into said open and closed positions, and temperature-responsive means coacting with said reciprocatory means and with said contact means and adjustable with respect to said reciprocatory means transversely only for varying the relative periods of dwell of the latter in said open and said closed positions.

10. A furnace control system comprising contact means movable into an opening and a closing position, eccentrically mounted means operable in a fixed orbit for effecting the operation of said contact means, and temperature-responsive means for varying the effective length of movement of said eccentrically mounted means.

11. A furnace control system comprising contact means movable into an opening and a closing position, eccentrically mounted means operable in a fixed orbit for effecting the operation of said contact means into said open and closed positions, and temperature-responsive means coacting with said eccentrically mounted means and said contact means for varying the relative periods of dwell of the latter in said open and said closed positions.

12. A furnace control system comprising contact means movable into an opening and a closing position, reciprocatory means for effecting the operation of said contact means, and temperature-responsive means comprising a structure having a slotted portion cooperating with said reciprocatory means for varying the effective length of stroke of said reciprocatory means.

13. A furnace control system comprising contact means movable into an opening and a closing position, eccentrically mounted means for effecting the operation of said contact means, and temperature-responsive means comprising a structure having a slotted portion cooperating with said eccentrically mounted means for varying the effective length of movement of said eccentrically mounted means.

14. A frame control system comprising contact means movable into an opening and a closing position, a reciprocatory structure having a slot therein extending at an acute angle with the line of reciprocation, reciprocatory means having a portion with a bearing in said slot, and thermostatic means for shifting the position of said bearing to vary the proportionate period of dwell of said contact means in its closed position.

15. A control system comprising energy control means movable into operating and idle positions, reciprocatory means for effecting the operation of said energy control means into said positions, and means including a diagonal bearing surface for laterally shifting the position of said reciprocatory means with respect to said energy control means to vary the relative periods of dwell of the latter in the operative and idle positions.

16. A control system comprising energy control means susceptible of a working and an idle position, reciprocatory means for effecting the operation of said first-named means, and means for expanding or contracting the effective length of said reciprocatory means with respect to a given position of said energy control means to vary the relative periods of dwell at working and idle positions of said energy control means.

17. A furnace control system comprising contact means movable into an opening and a closing position, a reciprocatory structure having a slot therein extending at an acute angle with the line of reciprocation, reciprocatory means having a portion with a bearing in said slot, means having an articulated joint for shifting the position of said bearing to vary the proportionate period of dwell of said contact means in its closed position, means for holding said articulated joint in a given position, and means for releasing said holding means under predetermined conditions.

18. A furnace control system comprising contact means movable into an opening and a closing position, a reciprocatory structure having a slot therein extending at an acute angle with the line of reciprocation, eccentrically mounted means having an arm with a bearing in said slot, means having an articulated joint for shifting the position of said bearing to vary the proportionate period of dwell of said contact means in its closed position, means for holding said articulated joint in a given position, and means for releasing said holding means at the end of a preselected time period.

19. A control system comprising energy-controlling means capable of movement into working and idle positions, reciprocatory means, for operating said control means, independently controlled means movable transversely to said reciprocatory means, and guiding a point of energy transfer between said reciprocatory means and said energy-controlling means, along a prescribed path, thereby to alter the period of dwell in the working position.

20. A control system comprising energy-controlling means capable of movement into working and idle positions, reciprocatory means, for operating said control means, independently controlled means movable transversely to said reciprocatory means, and guiding a point of energy transfer between said reciprocatory means and said energy-controlling means, along a prescribed path in a given plane, thereby to alter the period of dwell in the working position.

WALTER H. HIMES.

CERTIFICATE OF CORRECTION.

Patent No. 2,091,734.   August 31, 1937.

WALTER H. HIMES.

It is hereby certified that error appears in the printed specification of the above numbered patent requiring correction as follows: Page 4, second column, line 34, claim 14, for the word "frame" read furnace; and that the said Letters Patent should be read with this correction therein that the same may conform to the record of the case in the Patent Office.

Signed and sealed this 19th day of October, A. D. 1937.

(Seal)

Henry Van Arsdale.
Acting Commissioner of Patents.